US006374936B1

(12) United States Patent
Smith

(10) Patent No.: US 6,374,936 B1
(45) Date of Patent: Apr. 23, 2002

(54) HOOD CLOSURE GUIDE AND SEAL

(75) Inventor: Richard Jon Smith, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/620,507

(22) Filed: Jul. 20, 2000

(51) Int. Cl.$^7$ ............................................... B62D 33/06
(52) U.S. Cl. .................................. 180/89.17; 180/69.23
(58) Field of Search ............................ 180/89.17, 69.2, 180/69.21, 69.22, 69.23, 69.24, 69.25; 296/194; 414/722, 727, 685, 686, 694, 724

(56) References Cited

U.S. PATENT DOCUMENTS

| | | | |
|---|---|---|---|
| 3,572,813 A | * 3/1971 | Takada ........................ 296/196 |
| 4,186,476 A | * 2/1980 | Mair et al. .................. 29/407.1 |
| 4,707,021 A | 11/1987 | Meier et al. ................. 296/196 |
| 5,248,237 A | * 9/1993 | Nakamura ................... 414/686 |
| 5,671,820 A | * 9/1997 | Kobayashi et al. ......... 180/68.1 |
| 6,030,029 A | * 2/2000 | Tsuda et al. ................. 296/194 |
| 6,082,477 A | * 7/2000 | Murakawa ............... 180/69.21 |
| 6,135,223 A | * 10/2000 | Miyachi et al. .......... 180/69.21 |
| 2001/0004949 A1 | 6/2001 | Burgo ........................ 180/69.2 |

FOREIGN PATENT DOCUMENTS

| | | |
|---|---|---|
| DE | 82 12 782 | 5/1982 |
| DE | 297 17 226 | 9/1997 |
| EP | 0 900 715 | 9/1998 |

OTHER PUBLICATIONS

John Deere Brochure entitled "710D Backhoes", DKA1949, printed in the U.S.A., 1993.
Ford New Holland Brochure entitled Tractor Loader Backhoes 455D, 555D, 575D; 655D, printed in the U.S.A., 1992.
Patent Abstracts of Japan vol. 1998, No. 04, Mar. 31, 1998 & JP 09310376 A (Shin Caterpillar Mitsubishi Ltd), Dec. 2, 1997.
Patent Abstracts of Japan vol. 018, No. 463 (M–1664), Aug. 29, 1994 & JP 06 146342 A (Iseki & Co Ltd; others:01), May 27 1994.

* cited by examiner

Primary Examiner—J. J. Swann
Assistant Examiner—David R. Dunn

(57) ABSTRACT

The hood of a work vehicle is pivotally mounted to the supporting structure adjacent to a mast. The mast extends vertically upward form the supporting structure of the work vehicle. A work implement is operatively coupled to the mast. The mast is provided with left and right mast side walls. The interior of each of the side walls is provided with a guide and seal having a V-shaped cross section. The hood is provided with left and right side walls having left and right rear edges. The left and right rear edges are offset inwardly from the hood side walls. When the hood is closed, the left and right rear edges engage the left and right guides, wedging the edges into the V-shaped cross section. The base of each guide is provided with a tapered block. The tapered blocks are designed to engage a Z-bracket. The Z-bracket is located on the bottom corners of the hood side walls.

15 Claims, 3 Drawing Sheets

HOOD CLOSURE GUIDE AND SEAL

BACKGROUND OF THE INVENTION

1. Field of the Invention

The present invention is directed to a hood closure guide and seal for an off road work vehicle.

2. Description of the Prior Art

Backhoe loaders are common work vehicles. These vehicles are provided with a front mounted loader and a rear mounted backhoe. The lift arms of the loader are pivotally mounted to a mast extending upwardly from the supporting structure of the vehicle. A hood covering an internal combustion engine is located in front of the mast. The hood is made of sheet metal or plastic. With tilting hoods a gap is sometimes present between the mast and the hood. This gap is unsightly and allows noise, heat and contaminants to escape from the engine compartment. One method of sealing this gap is to use a foam and/or rubber gasket material. Although these materials may solve this problem for a period of time, the rubbing action of the hood causes these seals to fail prematurely. In addition, these gasket type seals do not provide stability to the plastic hoods.

SUMMARY

The hood of a work vehicle is pivotally mounted to the supporting structure adjacent to a mast. The mast extends vertically upward form the supporting structure of the work vehicle. A work implement is operatively coupled to the mast. The mast is provided with left and right mast side walls. The interior of each of the side walls is provided with a guide and seal having a V-shaped cross section. The hood is provided with left and right side walls having left and right rear edges. The left and right rear edges are offset inwardly from the hood side walls. When the hood is closed, the left and right rear edges engage the left and right guides, wedging the edges into the V-shaped cross section. The guide thereby provides a seal between the hood and the mast while also providing stability for the hood side walls.

The base of each guide is provided with a tapered block. The tapered blocks are designed to engage a Z-bracket. The Z-bracket is located on the bottom corners of the hood side walls. This tapered block/Z-bracket engagement provides additional stability for the hood side walls.

DETAILED DESCRIPTION

Figure 1:
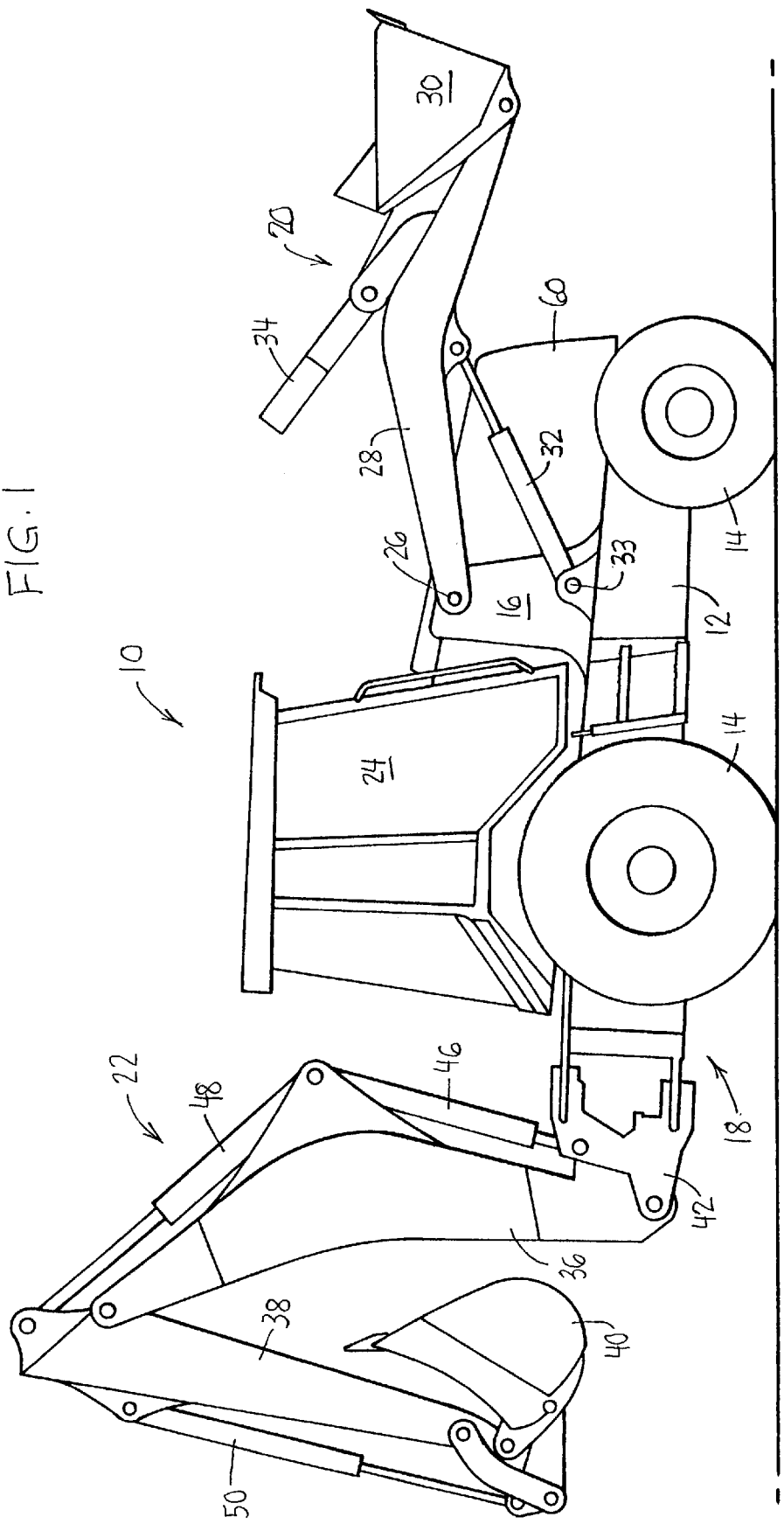
FIG. 1 is a side view of an off road work vehicle and more specifically a backhoe loader.
Figure 2:
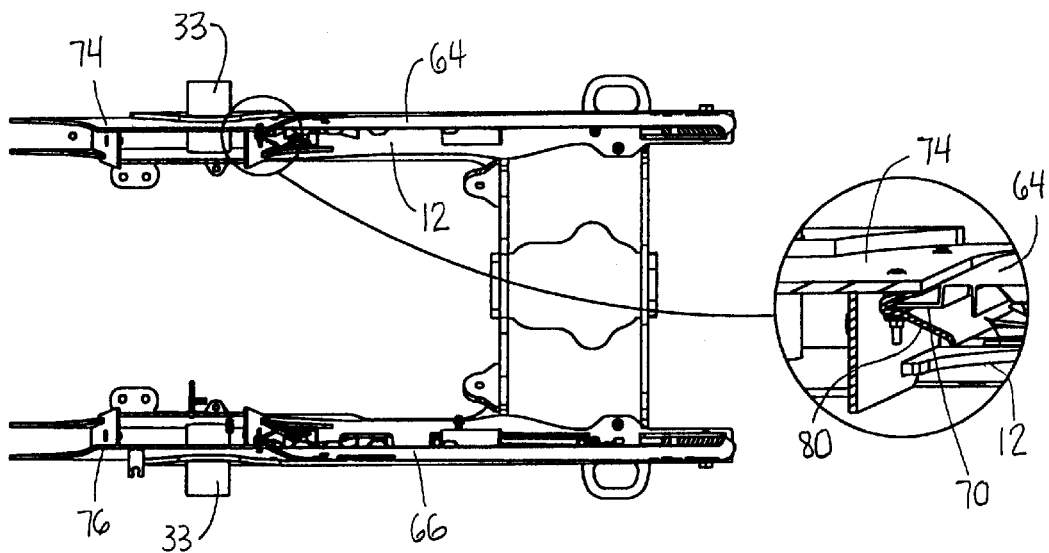
FIG. 2 is a perspective view of the mast, supporting structure and hood of the work vehicle.
Figure 3:
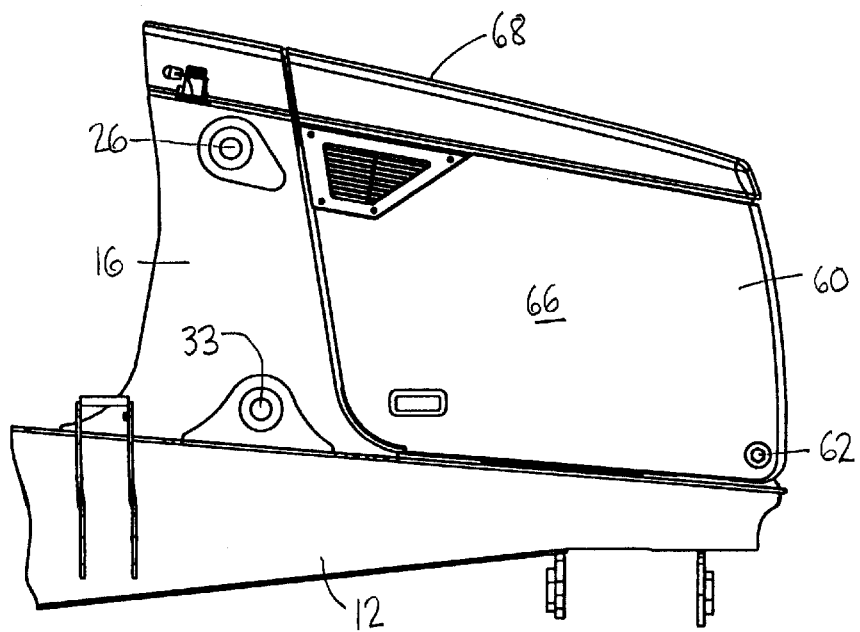
FIG. 3 is a cross sectional top view of the mast, supporting structure and hood of the work vehicle.
Figure 4:
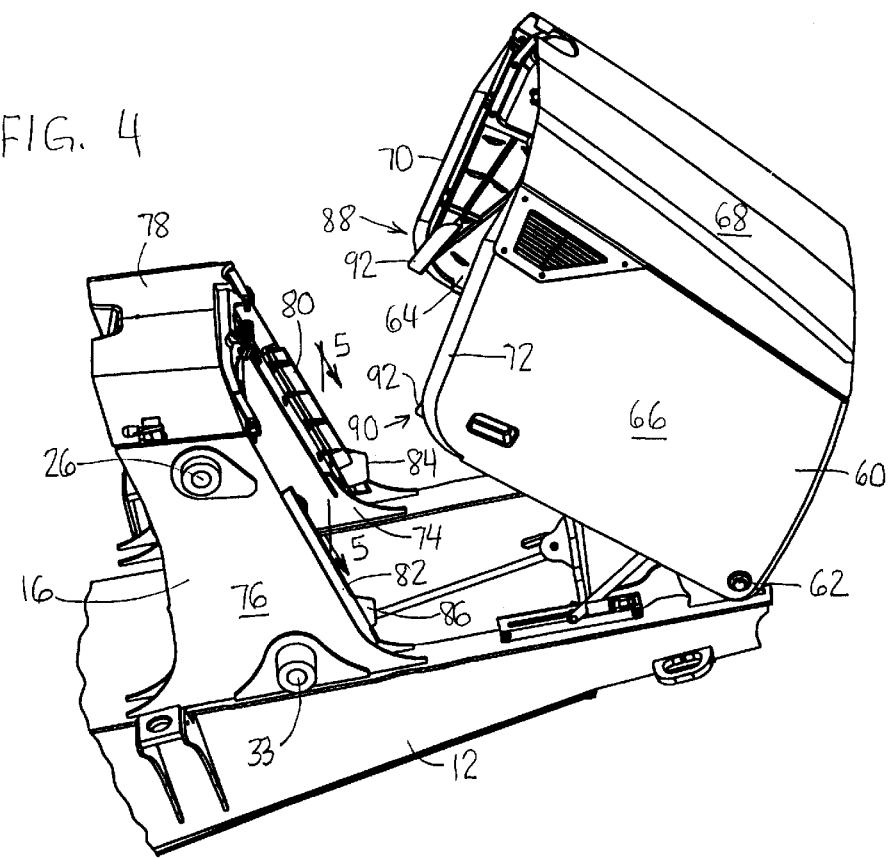
FIG. 4 is a side view of the mast, supporting structure and hood of the work vehicle.
Figure 5:
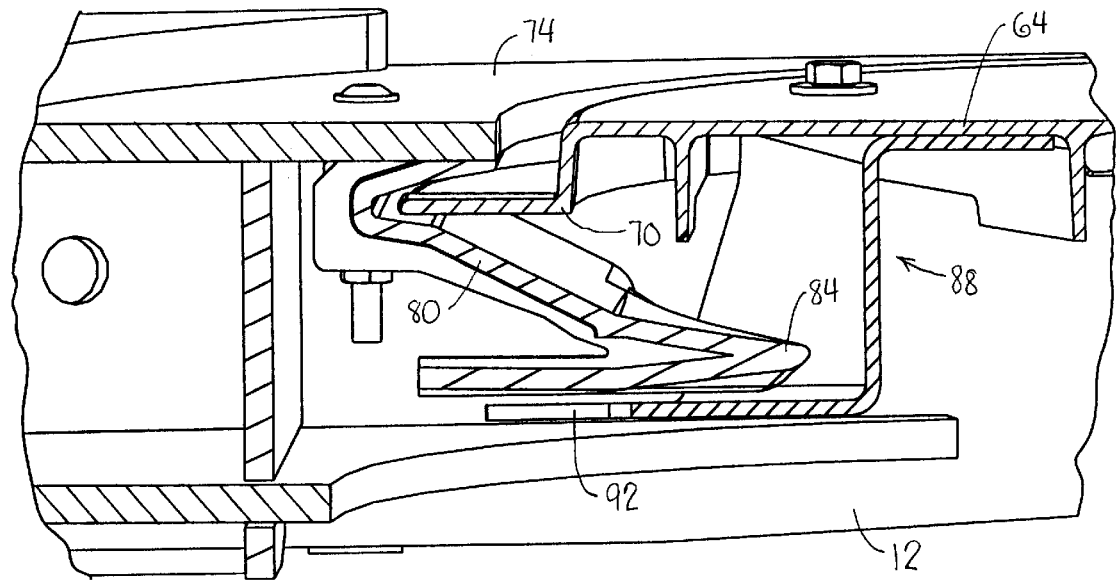
FIG. 5 is a partial cross sectional view taken along line 5—5 of FIG. 4 with the hood closed.

The work vehicle 10 illustrated in FIG. 1 is a backhoe loader. The work vehicle 10 is provided with a supporting structure 12 and ground engaging means 14 comprising wheels, which support and propel the supporting structure 12. Although the ground engaging means 14 of the illustrated embodiment are wheels, the present invention could also be used on tracked work vehicles having steel or rubber tracks. The supporting structure 12 is provided with a vertically extending mast 16. A first work implement 20 comprising a loader is operatively mounted to the mast 16 and the supporting structure 12. A second work implement 22 comprising a backhoe is mounted to the back 18 of the supporting structure 12. The operation of the work vehicle 10 and the operation of the first and second work implements 20 and 22 are controlled from operator's cab 24.

The loader 20 comprises lift arms 28 and a bucket 30. The lift arms 28 are pivotally mounted to the mast 16 at pivots 26. The lift arms 28 are provided with lift arm hydraulic cylinders 32 for lifting the arms 28 relative to the supporting structure 12. The lift arm hydraulic cylinders 32 are pivotally coupled to the supporting structure 12 at pivots 33. The bucket 30 is pivotally mounted to the end of the lift arms 28. Bucket 30 is provided with a bucket-tilt hydraulic cylinder 34 for tilting the bucket 30 relative to the lift arms 28.

The backhoe 22 is mounted to the back 18 of the supporting structure 12 and comprises a boom 36, a dipperstick 38 and a bucket 40. The boom 36 is pivotally coupled to a swing frame 42 about a vertical pivot and is raised and lowered relative to the swing frame 42 by a boom hydraulic cylinder 46. The dipperstick 38 is pivotally mounted to the boom about a horizontal axis and is pivoted relative to the boom 36 by dipperstick hydraulic cylinder 48. The bucket 40 is curled and uncurled relative to the dipperstick 38 by bucket hydraulic cylinder 50.

In the illustrated embodiment the swing frame 42 is pivotally coupled to the support structure 12. The swing frame 42 is pivoted relative to the supporting structure by swing frame hydraulic cylinders, not shown. The swing frame 42 could also be mounted to a side shift structure located between the swing frame 42 and the supporting structure for laterally shifting the swing frame relative to the supporting structure 12. The backhoe would normally be provided with stabilizers, not shown.

A front mounted internal combustion engine, not shown powers the work vehicle, which is mounted to the supporting structure 12 and housed by hood 60. The hood is pivotally attached to the supporting structure 12 by front mounted pivots 62. The hood has left and right hood side walls 64 and 66 and a hood top wall 68. The left and right hood side walls 64 and 66 have a planar exterior surface. The rear of the left and right hood side walls 64 and 66 are provided with left and right rear edges 70 and 72, respectively, which together define a rear edge. The left and right rear edges 70 and 72 are offset inwardly from the planar exterior surface of their corresponding hood side walls 64 and 66. The hood 60 can be formed from a light weight plastic material.

The mast 16 is provided with left and right mast side walls 74 and 76 and a mast top wall 78. The interior surfaces of the left and right mast side walls 74 and 76 are provided with upwardly extending left and right guides 80 and 82. The left and right guides 80 and 82 have a V-shaped cross section for receiving the left and right rear edges 70 and 72 of the hood 60 as it is being closed. The left and right guides 80 and 82 are plastic and the V-shaped cross section wedges the rear edge of the hood. The guides besides sealing the hood mast interface also act as stabilizers when the hood is closed. Basically the guides prevent the hood from vibrating which is unsightly and can cause stress cracks.

The bottom of the left and right guides 80 and 82 are provided with left and right enlarged tapered blocks 84 and 86. The left and right enlarged tapered blocks 84 and 86 engage left and right Z-brackets 88 and 90 bolted to the interior surface of the hood 60. The tapered blocks 84 and 86 are sandwiched between the inner most flanges 92 of the Z-brackets 88 and 90 and the respective rear edges 70 and 72 of the hood 60. The tapered blocks 84 and 86 and Z-brackets 88 and 90 further stabilize the hood 60.

By having the rear edges 70 and 72 offset inwardly and locating the guides on the interior surface of the mast side walls 74 and 76, the exterior planar surface of the hood side walls and the mast side walls are in line. This provides a smooth more aesthetically pleasing appearance. In addition, the guides and rear wedge are hidden from view.

The mast 16 is provided with a horizontally extending top rim 94. When the hood 60 is closed the interior surface of the top wall 68 rests on top rim 94. The top rim 94 and the top wall 68 are provided with a latching structure 96 for latching the hood 60 into its closed position.

The present invention should not be limited by the above-described embodiment, but should be limited solely by the claims that follow.

I claim:

1. A work vehicle for performing a work operation, the work vehicle comprising:

a supporting structure;

ground engaging means for propelling the supporting structure;

a mast extending upwardly from the supporting structure;

a work implement being operatively coupled to the mast for performing said work operation, the work implement is a loader having lift arms, the lift arms being pivotally coupled to the mast;

a hood extending forwardly of the mast and being pivotally mounted to the supporting structure, the hood having a rear edge that adjoins the mast;

two upwardly extending guides having a V-shaped cross section are mounted to the mast and engage the rear edge of the hood when the hood is closed against the mast and forming a seal between the mast and the hood.

2. A work vehicle as defined by claim 1 wherein the hood has left and right hood side walls, each of the hood side walls having an exterior planar surface, and the mast has a left and right mast side walls each having an exterior planar surface that is aligned with the exterior planar surface of the corresponding hood side wall when the hood is closed.

3. A work vehicle as defined by claim 2 wherein the left and right mast side walls are provided with an interior surface, the upwardly extending guides are mounted to the interior surface of the mast.

4. A work vehicle as defined by claim 3 wherein the rear edge of the hood comprises a left edge formed in the left hood side wall and a right edge formed in the right hood side wall.

5. A work vehicle as defined by claim 4 wherein the right an left edges are offset inwardly from the exterior planar surfaces of the corresponding hood side wall.

6. A work vehicle as defined by claim 5 wherein the mast is provided with a horizontally extending top rim and the hood is provided with a top wall that rests on the top rim when the hood is closed.

7. A work vehicle as defined by claim 6 wherein the top wall of the hood and the top rim of the mast are provided with a latch for latching the hood into a closed position.

8. A work vehicle as defined by claim 7 wherein both the left and right guides have bottoms, each bottom is provided with a tapered block, the hood is provided with left and right bottom corners adjacent to the left and right rear edges, each of the bottom corners having a bracket for engaging the respective tapered block.

9. A work vehicle as defined by claim 8 wherein the brackets are Z-brackets that are mounted to the left and right hood side walls, the Z-brackets each having an inner most flange that sandwiches the tapered block between the inner most flange and the respective rear edge.

10. A work vehicle for performing a work operation, the work vehicle comprising:

a supporting structure;

ground engaging means for propelling the supporting structure;

a mast extending upwardly from the supporting structure;

a work implement being operatively coupled to the mast for performing said work operation, the work implement is a loader having lift arms, the lift arms being pivotally coupled to the mast;

a hood extending forwardly of the mast and being pivotally mounted to the supporting structure, the hood having a rear edge that adjoins the mast and bottom corners that also adjoin the mast;

two upwardly extending guides are mounted to the mast and engage the rear edge of the hood when the hood is closed against the mast and forming a seal between the mast and the hood, both guides having a bottom, each bottom being provided with a tapered block, the bottom corners of the hood engaging the tapered blocks when the hood is closed.

11. A work vehicle as defined by claim 10 wherein the bottom corners are provided with brackets for engaging the tapered blocks.

12. A work vehicle as defined by claim 11 wherein the brackets are Z-brackets each having an inner most flange that sandwiches the tapered block between the Inner most flange and the hood.

13. A work vehicle as defined by claim 11 wherein the mast is provided with a horizontally extending top rim and the hood is provided with a top wall that rests on the top rim when the hood is closed.

14. A work vehicle as defined by claim 13 wherein the top wall of the hood and the top rim of the mast are provided with a latch for latching the hood into a closed position.

15. A work vehicle for performing a work operation, the work vehicle comprising:

a supporting structure having a rear mounted backhoe;

ground engaging means for propelling the supporting structure;

a mast extending upwardly from the supporting structure;

a loader having lift arms is operatively coupled to the mast;

a hood extending forwardly of the mast and being pivotally mount ad to the supporting structure about a transverse axis, the hood having a rear edge that adjoins the mast;

two upwardly extending guides are mounted to the mast and engage the rear edge of the hood when the hood is closed against the mast and forming a seal between the mast and the hood.

\* \* \* \* \*

UNITED STATES PATENT AND TRADEMARK OFFICE
CERTIFICATE OF CORRECTION

PATENT NO. : 6,374,936 B1
DATED : April 23, 2002
INVENTOR(S) : Richard Jon Smith It is certified that error appears in the above-identified patent and that said Letters Patent is hereby corrected as shown below:

<u>Column 3,</u>
Line 54, delete "an" and insert -- and --.

<u>Column 4,</u>
Line 2, delete "comers" insert -- corners --.
Line 2, delete "an" insert -- and --.

Signed and Sealed this

Twenty-fifth Day of March, 2003

JAMES E. ROGAN
*Director of the United States Patent and Trademark Office*